March 30, 1926. 1,579,044
T. WESTLEY
ROAD VEHICLE WHEEL HAVING DETACHABLE TIRE
Filed March 13, 1923 2 Sheets-Sheet 1
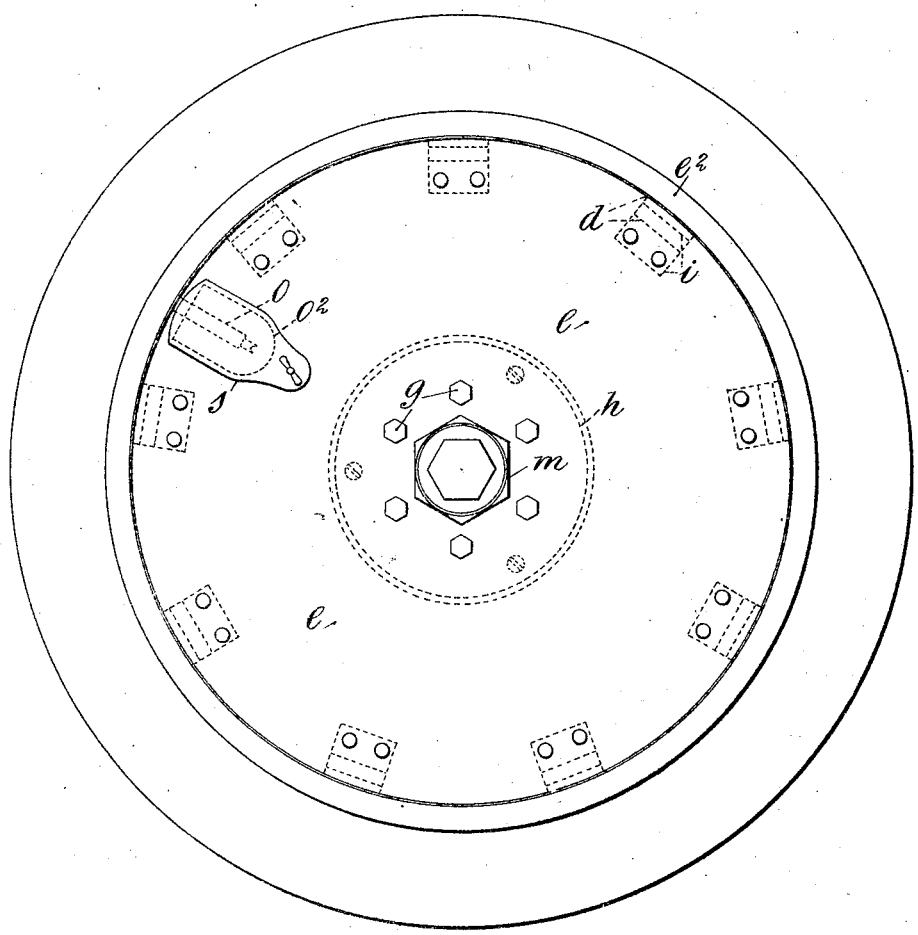

March 30, 1926. 1,579,044
T. WESTLEY
ROAD VEHICLE WHEEL HAVING DETACHABLE TIRE
Filed March 13, 1923 2 Sheets-Sheet 2
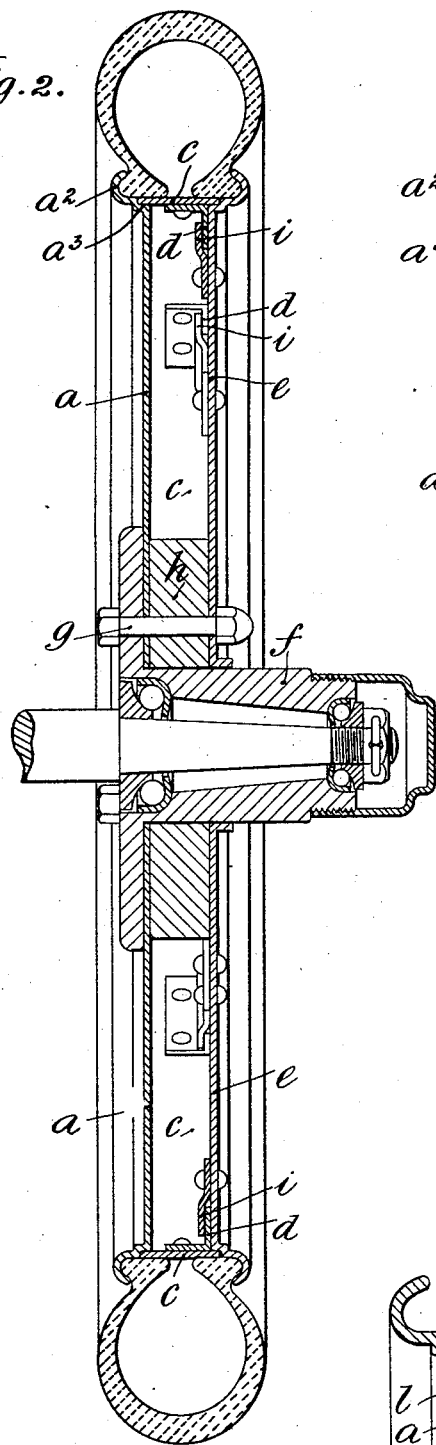
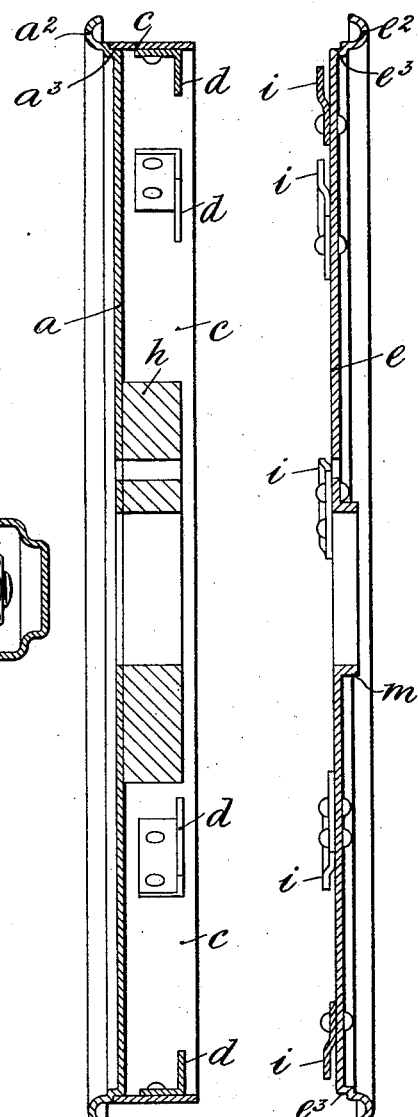
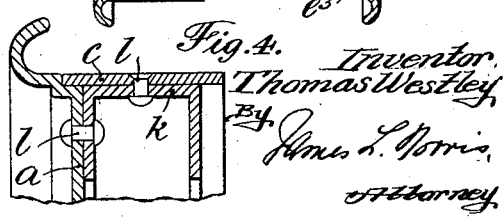

Patented Mar. 30, 1926.

1,579,044

UNITED STATES PATENT OFFICE.

THOMAS WESTLEY, OF DUDLEY, ENGLAND.

ROAD-VEHICLE WHEEL HAVING DETACHABLE TIRE.

Application filed March 13, 1923. Serial No. 624,824.

*To all whom it may concern:*

Be it known that I, THOMAS WESTLEY, subject of the King of Great Britain, residing at Dudley Brass and Bronze Foundry, Shaw Road, Dudley, Staffordshire, England, have invented certain new and useful Improvements in Road-Vehicle Wheels Having Detachable Tires, of which the following is a specification.

This invention relates to a road vehicle wheel of the disc type and adapted to carry a detachable tire. The wheel comprises two principal parts, the one a body-part consisting of a disc-like side and a lateral flange permanently attached thereto, and the other a detachable disc-like outer side, upon the removal of which the tire can be easily detached.

The invention provides an arrangement wherein each disc-like side is provided with a definite boss for engagement within the cylindrical centre to afford substantial internal diametric support to the latter. Said bosses are conveniently shaped as parts of the discs themselves.

Fastening devices are provided for securing the two principal parts together, said devices being locked in position by the bolts which serve for attaching the wheel to the axle box. Said fastening devices are in the form of flat plates held at a distance apart and rigidly applied to the cylindrical centre and to the detachable disc-like outer side, and having their opposed faces adapted to be brought into engagement with one another by a relative part rotation of the disc-like side about the cylindrical centre, these plates affording a large area surface in contact for fastening.

The preferred embodiment of the invention is illustrated in the accompanying drawings, wherein:—

Fig. 1 is a side elevation of the wheel and tire assembled and applied to the axle box.

Fig. 2 is a transverse section of Fig. 1.

Fig. 3 shows the two principal parts of the wheel separated.

Fig. 4 is a detail of a modification.

The body part of the wheel comprises the inner disc-like side $a$ from which rigidly projects the lateral flange $c$. The boundary of this side is flanged at $a^2$ to fit one beaded edge of a pneumatic tire casing. A feature of this body part is that the side $a$ provides at $a^3$ a boss adapted to fit within the hollow interior of the lateral flange to support said flange, said boss surrounding the periphery of the disc.

The other principal part is an outer disc-like side $e$ formed at $e^2$ with a boundary flange for the reception of the beaded edge of the tire, and at $e^3$ with a boss similar to the boss $a^3$, aforesaid to fit within the interior of the lateral flange $c$ to support said flange.

The two principal parts are secured to one another and onto the axle box $f$ by the bolts $g$, a distance piece $h$ of suitable material being provided between the two disc-like sides to surround said axle box.

The detachable outer side $e$ rigidly carries upon its inner face plates $i$ suitably distanced apart and adapted to co-act with similar plate-like pieces $d$ attached to the interior of the lateral flange to constitute fastening devices and which, by a partial rotation of the detachable side, are moved into and out of engagement for the purpose of holding the detachable side to the body. The bolts $g$ serve as a locking means for these fastening devices. The pieces $d$ are in Figs. 1 to 3 as being in the form of angle pieces but in Fig. 4 they are shown as formed by portions of channel sectioned pieces $k$ riveted at $l$ to the fixed side and lateral flange.

The detachable side is provided with a faceted portion $m$ for engagement by a spanner grip to partially rotate it in order to bring the fastening devices into and out of engagement. The fastening devices which may be formed in various ways, provided they are within the interior of the wheel when the two principal parts of the latter are assembled.

It will be clear from the drawings how the disc-like sides by their boss formation internally support the lateral flange and how the fastening devices are located within the lateral flange between the two disc-like sides; and it will be understood that the parts of the fastening devices are first put into non-coincident position and are then brought into engagement by the part rotation of the detachable side upon the body.

In Fig. 1 the valve stem is indicated at $o$ and the outer disc-like side is cut away at $o^2$ in order that it may be accessible for inflation purposes, and the cut-away part is covered by the removable plate $j$.

Having now described my invention what I claim and desire to secure by Letters Patent is:—

A vehicle wheel comprising an axle box, a disk secured to the axle box and having a peripheral tire-engaging flange, a rim flange secured at one side edge to the disk at the base of the peripheral tire-engaging flange, the said rim flange having angular locking plates secured thereto with the flanges of said latter plates projecting radially inwardly at intervals, a rotatable detachable disk having a peripheral tire-engaging flange with a cylindrical base to receive and engage under the outer edge of the rim flange, the rotatable detachable disk also having locking plate members secured thereto with the outer free extremities spaced therefrom to removably receive the inwardly projecting locking plates secured to the rim flange, and securing devices for uniting the disks and holding the detachable disk against rotation relatively to the said rim flange, the rotatable disk by its movement in one direction setting up a firm locking engagement of the locking plates with the locking plate members.

In testimony whereof I have hereunto set my hand.

THOMAS WESTLEY.